Patented Aug. 11, 1925.

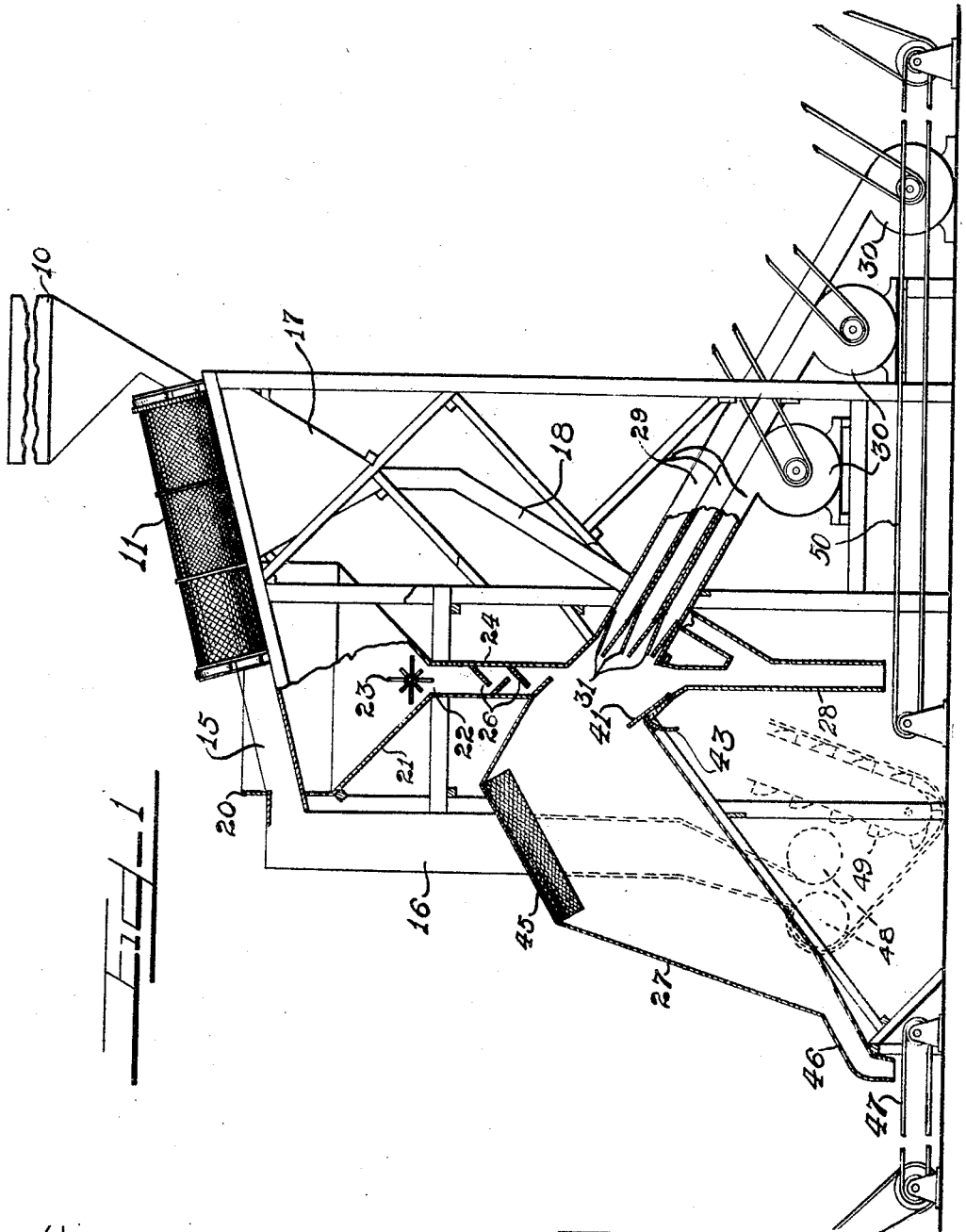

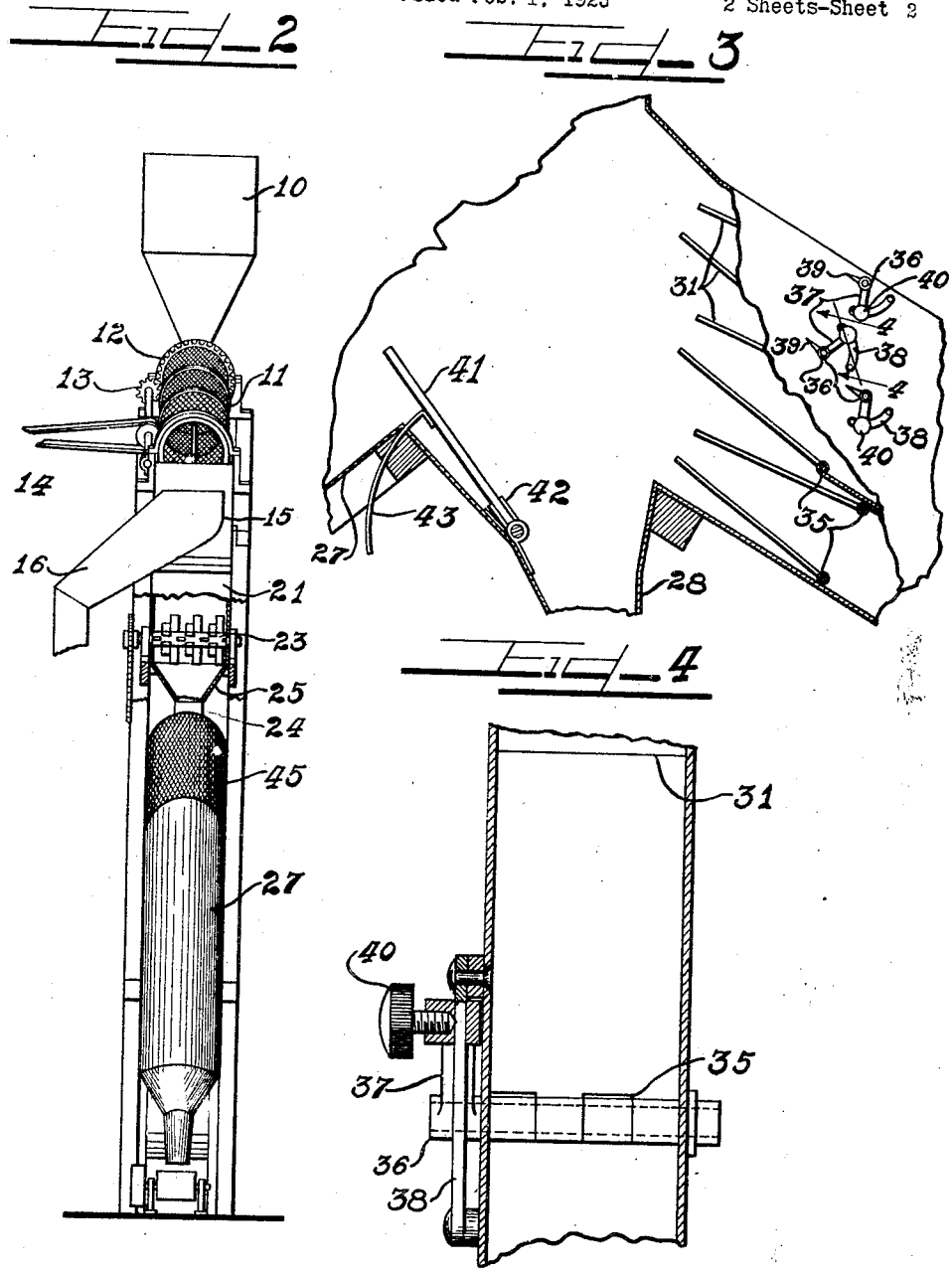

1,549,102

UNITED STATES PATENT OFFICE.

JOHN B. ARPIN, OF WISCONSIN RAPIDS, WISCONSIN.

PROCESS AND APPARATUS FOR SEPARATING MIXED MATERIALS.

Application filed February 1, 1923. Serial No. 616,422.

*To all whom it may concern:*

Be it known that I, JOHN B. ARPIN, a citizen of the United States, and a resident of Wisconsin Rapids, in the county of Wood and State of Wisconsin, have invented certain new and useful Improvements in a Process and Apparatus for Separating Mixed Materials; and I do hereby declare that the following is a full, clear, and exact description of the same, reference being had to the accompanying drawings, and to the numerals of reference marked thereon, which form a part of this specification.

This application is a continuation in part of my application for "Process and apparatus for separating material", Serial No. 575,269, filed July 15th, 1922.

This invention relates to mechanism by which the coke is reclaimed from the ashes from the furnaces of locomotives, industrial plants or the like.

It is an object of this invention to provide means for recovering the coke which shall be inexpensive to operate and maintain, and will recover a fair percentage of the coke thoroughly separated from other material.

It is an object of this invention to provide a method whereby a mixture of substances may be separated, both according to the size of the particles, and according to their specific gravity, the heavy particles being mingled with the fine particles, and the particles which are both coarse and light being separated from the rest of the mixture.

It is a further object of this invention to subject the mixture to successive separations of different character, as, for example, first by sifting and then by blowing.

It is a further object of this invention to provide a pneumatic separating means in which the material to be separated is subjected to progressively increasing currents of air.

It is a further object of this invention to provide an apparatus in which all the material to be reclaimed is delivered at one point and all the material to be discarded is delivered at another point.

It is a further object of this invention to deliver at a third point material which should be reground and resubjected to the separating process.

It is a further object of this invention to provide adjustable means for regulating the strength of the air current used and an adjustable dividing plate for determining the division point in the separation.

Other and further important objects of the invention will be apparent from the disclosures in the accompanying drawings and in the following specification.

The invention (in a preferred form) is illustrated in the drawings and hereinafter more fully described.

On the drawings:

Figure 1 is a side view partly in section showing the general arrangement of the apparatus.

Figure 2 is an end view of the same.

Figure 3 is a detail on a larger scale partly in section showing the arrangement for adjusting the several nozzles.

Figure 4 is a section upon the line 4—4 of Figure 3 on a still larger scale.

As shown on the drawings:

The apparatus has a framework supporting a hopper 10 into which the ashes to be separated are dumped. Beneath this hopper 10 is an oblique cylindrical sieve 11 mounted for rotation. A gear 12 at one end of the sieve affords a means by which it is rotated. The sieve may be driven by any suitable arrangement, for example by a pinion 13 on a shaft driven by a belt 14, as illustrated in Figure 2.

The lower end of the sieve 11 delivers the coarsest material through a chute 15 into a trough 16. The finest material passes through the meshes near the upper end of the sieve 11 and descends through a funnel or hopper 17 into a spout 18. The coarser material passes through the coarser meshes near the lower end of the sieve and is received in a hopper 20. The very coarse material which could not pass through any meshes of the sieve descends in the chute 15 into the trough 16, from which it passes through a pair of crushing rolls 48 to a bucket or other conveyor 49 and thence passed again into the hopper 10.

The lower part of the hopper 20 is funnel-shaped, as shown at 21, and concentrates the ashes at a long narrow exit 22, in which is mounted a rotary device 23 which serves to stir the ashes to break up whatever lumps may be therein, and to insure a fairly regular delivery into the delivery spout 24. Preferably this spout is tapered in a plane parallel to the length of the axis of the rotating device 23, as shown at 25 in Figure 2. The spout 24 is equipped with baffle plates 26 which cause the descending material to spread out into a thin sheet in which form it is delivered into the casing 27. The delivery spout 28 projects downward from the casing 27 at a point beneath the spout 24, and the delivery spout 18 joins the spout 28. Beneath the mouth of the spout 28 is a conveyor belt 50 by which the material delivered from the spout 28 is removed to any convenient depositing point.

The path from the spout 24 to the spout 28 lies across the currents of air from a series of air pipes 29. Each of these pipes is fed by a fan 30. The fans 30 and the conveyor belt 50 are driven by any convenient source of power, as indicated on the drawing by belts. The mouths of the several pipes 29 are closely adjacent a line from the spout 24 to the spout 28. Each of these mouths consists of two pivoted regulating vanes or dampers 31.

Each damper 31 is pivotally mounted, as shown at 35 in Figure 3, to one wall of its pipe. For the ready control of these dampers, each has an axle at its hinge. Each axle is protruded through one wall of its pipe, as shown at 36. On the outside of each pipe, the axle 36 of the hinge is secured to an arm 37, the distal end of which moves over a quadrant 38. Integral with the axle 36 is a pointer 39, which always shows the direction of the damper 31. The end of the arm 37 is bifurcated and straddles the quadrant 38. This end is supplied with a set screw 40 by which the arm and consequently the damper is secured in any selected position. By setting the dampers so that they converge, the air from the pipes may be made to issue in a thin stream, or by setting the dampers so that they are more nearly parallel, the mouth of the pipe may be made wider.

The direction of the stream of air from a pipe can be changed within limits by an appropriate setting of the two dampers on that pipe.

On the side of the spout 28 opposite the mouths of the pipes 29 a division plate 41 is mounted by a hinge 42 similar to the hinges used in connection with the dampers 31, and a similar arm, pointer and quadrant are supplied upon the outside of the casing where the delivery spout 28 begins for regulating the position of the division plate 41. To prevent an accumulation of coke beneath the division plate, a curved apron 43 is provided. Preferably also a slot is provided in the casing 27 to accommodate this apron.

The casing 27 has an opening opposite the pipes 39 through which the air from these pipes may escape. Preferably this opening is covered by a fine mesh screen 45 to prevent any material being carried out of the casing along with the air. The bottom of the casing 27 slopes downward and away from the upper mouth of the spout 28, so that the material deposited in the casing by the action of the air descends by gravity and emerges from a spout 46 onto a conveyor belt 47, by which it is carried to any convenient place of deposit.

In the operation of the apparatus, ashes are delivered to the hopper 10 and pass down the sieve 11. The dust or finer portion of the ashes passes through the finer meshes of the sieve and descends in the hopper 17, the spout 18 and spout 28 to the conveyor 50, by which it is carried away. The somewhat coarser material, which is made up largely of a mixture of coke and slag, passes through the coarser meshes at the lower end of the sieve and is received in the hopper 20. It descends in this hopper and by the converging walls 21 at the bottom thereof is brought to the distributor 23.

This rotating device is provided with long and short arms arranged in sets. Each set of arms is in a plane at right angles to the axes of the stirrer and consists of two arms extending radially in opposite directions. Each step is staggered circumferentially about the axis from the neighboring set and each third set is made with shorter arms. The two sets consisting of long arms are staggered 90° and the short arms are at 45° to each neighboring set. The longer arms serve to stir up the contents of the hopper. The shorter arms afford space for the lumps to get between the ends of said arms and the wall of the hopper. In the rotation of the device the arms catch the lumps which have arrived in such a position and crush them between their ends and the sides of the hopper. These lumps are made simply by the cohering action of the material which has passed through the coarse meshes at the bottom of the sieve. They are not solid single pieces of clinker or of coke and consequently no great power is required to crush them. The rotating device 23 also serves to give a somewhat regular character to the delivery from the bottom of the hopper. This delivery is concentrated by the converging walls 25, shown in Figure 2, in the central part of the baffle plate 26, but in descending from one baffle plate to the next, the material is spread out so that as it emerges from the lower end of the spout 24, it is in a thin stream.

This stream passes through the current of air delivered by the pipes 29. The lighter particles are blown by this air farther than the heavy material. Also the finer materials are blown farther than the coarser materials. The air from the uppermost pipe 31 moves the finer and lighter particles so far from the pipe that they get beyond the edge of the plate 41. Heavier and coarser particles fall through the stream without being carried far enough by it to escape the plate 41. The first pipe therefore separates the major portion of the coke from the clinker. This separation is almost wholly due to the difference in density of the particles because the sifting action has largely reduced the variation in size.

As the mixture comes into the current from the second pipe 29, the coke which was not moved far enough by the current from the first pipe is moved further and the clinker is but little affected. Thus a more complete separation is brought about by the current from the second pipe. The current from the third pipe acts to still further increase this separation. Also this pipe is low enough so that the current from it strikes the upper part of the division plate 41 and creates an eddy which causes the particles of coke which have very nearly but not quite passed over the edge of the plate 41 to be caught and be carried upward and finally carried over this plate.

Upward motion of the lighter particles is produced, in part at least, by the fact that the pipes point upward. Clinker or other material of fairly dense character is but little affected by the upward component of the movement of the air; but the coke, being lighter, has its rate of fall materially checked by this upward component. Thus the separation between the clinker and the coke is more effectually brought about because of the inclined character of the air stream.

The plate 41, being adjustable, the limit between the pieces of coke having small particles of clinker attached to them and the pieces of clinker having some coke in them may be fixed by the operator so that the percentage composition of the classes in the classified material is controlled by this adjustment.

The material which passes beyond the edge of the division plate 41 settles through the comparatively quiet air in the tapering part of the casing 27 and slides down the oblique bottom of this casing to emerge through the spout 46. Some of this material settles down very close to the division plate 41. In order to prevent such material from getting between the plate 41 and the wall of the casing and so preventing proper movement of the plate 41, the apron 43 is provided. As the plate 41 is moved in process of adjustment, the shield 43 follows the movement by projecting more or less through the lower wall of the casing 27, so that in all positions of the division plate 41, the space between it and the wall is protected from the material settling therein.

The coke passing out through the spout 46 is received on the conveyor 47 and carried to whatever storage place is provided.

I am aware that numerous details of construction may be varied through a wide range without departing from the principles of this invention, and I therefore do no purpose limiting the patent granted, otherwise than necessitated by the prior art.

I claim as my invention:

1. In a device for separating coke from ashes, a screening mechanism having meshes of several sizes, means for conducting the material which passes through the finer meshes, a pneumatic separating device receiving the material which passes through the coarser meshes, conductor means for receiving the heavier material from said pneumatic separating device, said conductor means joining the first-mentioned means for conducting, whereby the material which passes through the finer meshes and the heavier material from the pneumatic separation device are delivered together.

2. In a device for separating coke from ashes, a screening mechanism having meshes of several sizes, means for conducting the material which passes through the finer meshes, a pneumatic separating device receiving the material which passes through the coarser meshes, conductor means for receiving the heavier material from said pneumatic separating device, said conductor means joining the first-mentioned means for conducting, whereby the material which passes through the finer meshes and the heavier material from the pneumatic separation device are delivered together, means for delivering at another point the material which passes through no meshes of the sifting mechanism, and means for delivering at a third point the lighter material from the pneumatic separating mechanism.

3. In a device of the class described, a sifting mechanism for separating the material into several grades, a pneumatic separating device properly situated to receive one of said grades, said pneumatic device separating said grades into sub-grades, and having delivery points one for each sub-grade, conveying mechanism for removing said sub-grades, and conducting arrangements for bringing the grades of sifted material finer than the grade delivered to the pneumatic separating mechanism to one of said conveying mechanisms.

4. The process of recovering coke from ashes which consists in sifting the ashes to remove the dust, further sifting of the coarser parts to separate the lumps from the mixture of coke and clinker, grinding the lumps so separated and reintroducing them into the process at its beginning, permitting the mixture of coke and clinker to fall through a moving stream of fluid, conveying the clinker and dust to a deposit point and the coke to a different deposit point.

In testimony whereof I have hereunto subscribed my name in the presence of two subscribing witnesses.

JOHN B. ARPIN.

Witnesses:
 CARLTON HILL,
 OSCAR HARTMANN.